Nov. 19, 1968 F. L. CALHOUN 3,411,625

PATTERN RECOGNITION DEVICE

Filed Aug. 12, 1965 3 Sheets-Sheet 1

INVENTOR.
Fredrick L. Calhoun

By Smyth, Roston & Pavitt

Attorneys

INVENTOR.
Fredrick L. Calhoun
By Smyth, Roston & Pavitt
Attorneys

INVENTOR:
Fredrick L. Calhoun

By Smyth, Roston & Pavitt
Attorneys 3,411,625

Patented Nov. 19, 1968

3,411,625

PATTERN RECOGNITION DEVICE

Fredrick L. Calhoun, Torrance, Calif., assignor to Industrial Dynamics Company, Ltd., Torrance, Calif., a corporation of California Filed Aug. 12, 1965, Ser. No. 479,121
15 Claims. (Cl. 209—111.7)

ABSTRACT OF THE DISCLOSURE

This invention relates to a system for sequentially activating a plurality of energy-sensitive members on a repetitive basis to determine the presence or absence of a particular phenomenon or pattern in an object such as a container. Each of the energy-sensitive members in the plurality is positioned to receive the energy from an individual portion of a particular area on the object such that the energy-sensitive members receive energy from all of the particular area on a composite basis. When the energy-sensitive members are sequentially activated, a particular signal is produced to indicate the presence or absence of the particular phenomenon or pattern. This signal may constitute an oscillatory signal having a particular frequency.

The present invention relates to pattern recognition devices particularly of the type using radiation for identifying or defining the pattern.

For handling large quantities of objects it is often required to detect particular characteristics of the individual objects. For example, containers such as boxes, bottles, etc. are to be inspected as to features which are optically distinguishable. Herein is included, for example, absence or presence of a label, absence or presence of a particular label; absence or presence of lettering, codes or other identifying marks; absence or presence of damage or dirt etc. These cases have in common that the feature of interest is subject to optical detection in that it produces a regional modulation of illumination. Regional modulation includes the case wherein neighboring areas of a large inspection area transmit, reflect or refract radiation to a different degree. Regional modulation includes further the case where the same area may reflect or refract radiation differently in different direction depending upon the specific characteristics of the object in that area.

A radiation detector, for example, observing the light from a region which includes a portion of a container will be energized in accordance with, for example, the reflection characteristics of that particular portion of the container. A second, but similar detector observing the light from a neighboring region, will receive radiation that is similar provided these two neighboring surface area portions of the container have similar reflection characteristics and receive a similar quantity of light as illumination. Any deviation in the relation of the characteristics of these neighboring areas results in a difference in light energy as received by the two detectors. Such deviation may or may not occur when containers pass sequentially past the detectors. A similar situation exists, as stated, if the observed characteristic exhibits itself to a different extent or degree depending upon the angle of observance. Hence, a characteristic feature of the object observed may have particular reflection characteristics which varies in two or more different directions, depending on absence or presence of a particular surface feature. A change in the relative light intensities as reflected in different directions from the same area is thus an indication whether or not the object has the particular feature.

Thus in either case there results an observable pattern in that a particular situation of regional illumination modulation establishes a first relation in light intensities as observed by two (or more) detectors; while a deviation in the modulation (i.e. a different pattern), causes a change in relation of the intensities as observed by the detectors.

It will be appreciated that the resolution of such observation, i.e., the distinguishability among different patterns, as well as the extent of discernibility of absence or presence of a pattern however defined, depends on the size of the region observed by an individual detector and on the number of detectors employed. Thus, the resolution of the electro optical system determines what constitutes a pattern and how accurately and detailed it can be defined. It must be mentioned here, that the word pattern is not meant to imply regularity. Regional modulation of radiation as defining a pattern may or may not be irregular in nature. Random patterns are established for example by dirt particles or manifestations of damage, whereby the particulars of the pattern are not important but the mere presence of such a pattern is the point of interest.

One of the problems encountered in optical inspection or observation systems is a change in ambient light conditions, changes in the light intensity of a special source of illumination and changes in the characteristics of circuit elements employed.

For pattern recognition of the type outlined above this is particularly disturbing as such changes in operation conditions may at times simulate the presence of a pattern, though it is not then actually present and vice versa.

This is particularly so where the pattern is a simple one. For example, dirt or damage marks on a container can be such a pattern, whereby dirt particles in the observation field produce a pattern. Any dirt particles anywhere in the observation field produce a pattern while a clean container will exhibit itself as "no pattern" situation. A change in operating conditions such as ambient light may readily simulate here a pattern situation though there is none.

The invention now relates to a system which renders pattern recognition independent from such change in operating conditions. Systems are known which attempt to eliminate the influence of changing ambient light conditions by using a detector that responds only to these ambient conditions, and provides for a signal which is used to offset any possible effect the condition change may have on the pattern detectors. This method has proven widely satisfactory but has its limitations. For example, where the pattern to be detected is defined by particular, highly directional components of light such as results from specular reflection of light from a particular source, it is rather arbitrary to define the ambient light conditions as these may result from various sources influencing the particularly oriented detectors, but not the ambient condition monitor. One could use the sum of all detectors as reference, but this by itself may well be pattern, particularly where the number of detectors employed is rather small.

The invention now provides for a system obviating these deficiencies and permitting employment as pattern recognition device in the widest sense with little or no detrimental influence from a change in ambient and other operating conditions.

It is a feature of the invention to reference the detector elements against each other as far as their individual outputs are concerned by scanning and sampling the outputs of them sequentially, thereby producing signal oscillations as the result of their outputs individually deviating from each other in the sequence of interrogation. The individual detectors responding in toto to regional modulation will be sampled sequentially to provide a composite signal that reproduces the regional modulation by sequential referencing whereby only relative variations are used. Since the sequence of scanning or sampling the output signal values of these detectors is predetermined, any distinguishable pattern or group of patterns will result in a particular wave train or class of wave trains which in turn exhibit a particular distribution of frequencies. This frequency distribution is not disturbed when the ambient illuminating conditions change.

For reasons of providing sufficient system reliability, it is of advantage to use the individual detectors only in a binary type fashion as far as their output signals are concerned by merely distinguishing between darkness or little light and considerably more light or brightness. Thus, the output of the individual detectors should be used only in a true-false analogy, and the pattern or patterns to be identified or recognized should lend themselves to a definition in terms of particular true-false combination states of the detectors. Many cases can be defined in the sense that all situations in which any pattern is detected, require similar steps to be taken as a result of the detection of a pattern, while these situations merely need to distinguish from the absence of any pattern case. For example, where a container is inspected as to cleanliness any dirt particles detected by any detector results in an observed pattern, and all such patterns fall into one class of situation, namely, that the container is dirty and should be eliminated. A clean container produces an absence-of-any-pattern situation to be distinguished from the presence-of-any pattern case. A completely uniformly dirty container may also produce an absence-of-any-pattern situation, but can be handled differently.

A system converting regional radiation modulation into any oscillatory signal train by sequential sampling has the additional advantage that the scanning system has no movable parts, and the inspection or observation is carried out at instants of comparatively motionless relative position between object and inspection apparatus. Thus, the present invention is an improvement along this particular aspect of systems as set forth in U.S. Letters Patents No. 3,133,640 and No. 3,081,666 and my application Ser. No. 387,287 filed Aug. 4, 1964, now Patent No. 3,349,906. The elimination of movable parts from the inspection system does not mean that a true stationary position of the object observed is required, but the inspection period can be selected so short, that the object is displaced only very little during that period. Thus, the oscillations in the composite inspection signal are not attributable to any physical movement as between inspection apparatus and object, but the sequencing and rate of sampling the signals furnished by the several detectors is the major cause for oscillatory signal components.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawing in which:

FIGURE 1 illustrates somewhat schematically the basic layout of a pattern recognition device in accordance with the present invention;

FIGURES 2*a*, 2*b* and 2*c* illustrate three wave trains as developed within the device shown in FIGURE 1;

Figure 1:
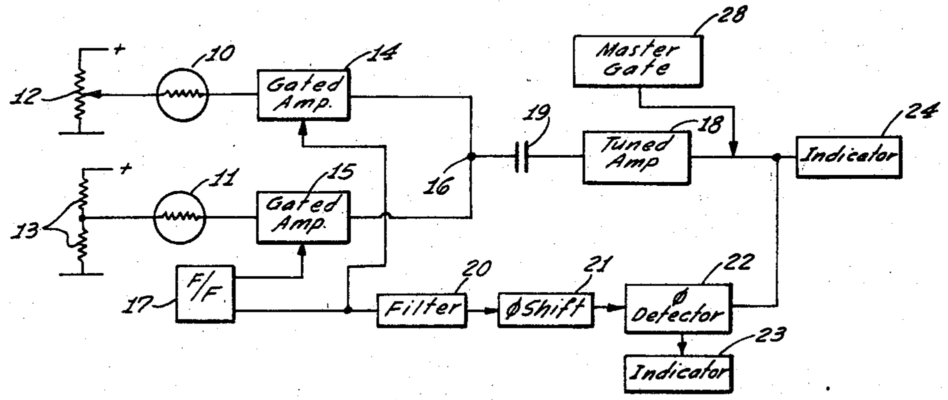

Proceeding now to the detailed description of the drawings, in FIGURE 1, thereof, there is shown the most simple basic pattern recognition device practicable within the concept of the present invention. The principal input elements of this recognition circuit is comprised of two photoelectric cells, photo resistors or solar cells 10 and 11 positioned in an environment wherein the ambient illumination level may vary. These two photosensitive elements when positioned adjacent the characteristically radiating or reflecting object are capable of distinguishing in form of binary signals between four different patterns:

In the first pattern, both photosensitive elements receive little or no light, or only ambient light as a result of a uniformly dark non-reflecting or non-transmitting surface confronting the photosensitive elements in uniform spatial relationship. The second pattern is a uniformly strong reflection, emanation or transmission of radiation, such radiation being particularly uniform as far as received by the two photosensitive elements. The third pattern is one in which, for example, element 10 receives more radiation than element 11, while the fourth pattern consists of the situation where the element 11 receives more radiation than the element 10.

These conditions can be restated in considering the electrical outputs of the photosensitive elements: by connecting one of the elements to an emitter or cathode follower type amplifier, one can obtain output signals that vary inversely with the variation of the illumination signal strength as picked up. As this signal inversion possibility applies to the photosensitive elements individually, the correlation between the signal output combinations and patterns is selectable at will. In particular, a uniform illumination reaching both elements may result in differing outputs if only one element connects to an inverting amplifier while the amplifier for the other element does not. In any event, four different signal-output combinations can be realized, two of which correspond to uniform illumination and the two other output signal combinations correspond to two different patterns defined by regional contrasts or modulation or different illumination signal levels resulting from any cause.

Thus, for cases wherein the outputs of the sensitive elements (with amplifier) are equal, this will be called an absence-of-pattern situation, while differing outputs represent a true pattern situation, which is independent from absence or presence of regional illumination modulation due to individual signal conversion. In general, the "true" pattern situation distinguishes from the "uniform" pattern situation in that, for the true pattern case the two photosensitive elements receive individually such quantities of radiant energy so that their output signals differ; substantially similar output signals define the absence-of-pattern. The particulars of the patterns are identified by which one of the two photosensitive elements (plus amplifier) produces a large and which one produces a small output signal.

The statement above that the two different uniform illumination type patterns can be recognized as distinct true patterns by means of employing inverters must be qualified. If such high or low uniform illuminations are to define distinctive patterns, it is still necessary to either employ an ambient light condition monitor or ensure constant ambient light conditions, as otherwise a change in ambient light conditions will simulate a change in pattern. This, however, is a special case and can be dealt with still within the concept of the invention. An ambient condition monitor may have its output added to that of the element feeding an inverter, so that their common output will stay constant in case of ambient light changes, but the ambient light monitor does not prevent signal increase when incident to a pattern This does not negate what was said with regard to the advantages of the invention in general, but merely shows, that the inventive concept is of a rather general nature even though for special cases not all advantages can be realized as it can be done for most applications; this will become more apparent when discussing the several embodiments.

If both sensitive elements connect to similar type amplifiers the true pattern situation as realized by the output signals corresponds to a regional modulation of illumination in that the two light sensitive elements pick up differing illumination strength signals. FIGURE 1 illustrates this situation. It is now significant that the true pattern situation can be recognized in a manner which is independent from any change in ambient light conditions as well as in the overall light transmission or reflection characteristics of the surface or area that confronts the two photosensitive elements.

Photosensitive element 10 is biased by a variable or adjustable resistor 12 connected between a source of D.C. potential and ground to establish a particular bias level within the element 10. The photosensitive element 11 is biased preferably through a voltage divider comprised of resistors 13 and connected between the same voltage source terminals as is the resistor 12. The adjustability of the resistor 12 permits the element 10 to be biased to the same signal output level as provided by element 11 under any uniform ambient light condition. The prebiasing can take also into consideration that the characteristics of the two photosensitive elements will not be exactly equal.

Thus, at the respective two output sides of the two elements an "absence-of-pattern" situation manifests itself in equal signal levels. The output sides of elements 10 and 11 are respectively governed by gates 14 and 15, which are preferably gated amplifiers with linear or at least monotonic signal transfer capabilities over a desired range at gated-open conditions. At proper bias adjustment of the control circuits for the photosensitive elements as well as of the gates themselves, equal signal levels will appear at a joint output terminal 16 for the absence-of-pattern case.

We proceed now to the description of the gating control circuit for this particular circuit network. In its simplest form, this gating control circuit may be comprised of an astable multivibrator 17 having two output terminals establishing alternating true and false output signals, and at any instant, of course, the two output signals are at opposite states. This multivibrator 17 controls with its two output sides the two respective gating terminals of gates 14 and 15.

It thus appears that the terminal 16 will alternatingly receive signals which denote or are representative of the illumination levels as individually monitored by photosensitive elements 10 and 11. As long as there are no patterns in the information that reaches the two photosensitive elements, the terminal 16 receives a uniform signal level. This signal level may be high or low and it may vary by virtue of a change in ambient light conditions, but it is extremely unlikely that there is a variation (in time) which corresponds to the multivibrator frequency. This, of course, is a matter of proper selection of the multivibrator frequency, and frequencies in the kilocycle range are envisioned here.

Thus in the "absence-of-pattern" situation the output as provided in terminal 16 is characterized by the absence of an oscillating signal having the frequency of multivibrator 17. The "presence-of-pattern" case is indicated by an oscillating signal at terminal 16 having the multivibrator frequency. Mere presence of a pattern is simply signified by an alternating signal, independent from the zero level thereof, the minimum and maximum amplitudes of such signal and the phase thereof. Thus, the "presence-of-pattern" situation may be recognized by providing the output of the signal at terminal 16 to an A.C. amplifier 18 which suppresses all D.C. components. This is symbolized by a capacitor 19 for input coupling. Thus, the presence of a pattern is indicated by a signal output of amplifier 18 having the multivibrator frequency while absence of a pattern is indicated by an absence of any output of amplifier 18. Signal enchancement may be aided by using a tuned amplifier, the tuned frequency being that of the multivibrator.

More generally, a filter is incorporated in amplifier 18, having preferably a narrow band pass characteristic and being tuned to the frequency of the multivibrator 17. The purpose of this filter is to eliminate the influence of any rapid step function type illumination change which reaches the two photosensitive elements 10 and 11 more or less equally but is effective as an A.C. type signal at the input side of amplifier 18.

For purposes of noise suppression, it may be advisable to give the amplifier 18 threshold characteristics, as far as its input is concerned. In addition, it may be advisable to give the amplifier 18 a characteristic so that the A.C. output it produces whenever the input threshold has been exceeded has a constant amplitude. This is to eliminate any amplitude variations in the signals resulting from any overall variation or change of brightness not eliminated by the A.C. coupling.

Thus, the amplifier 18 should have a narrow band pass, constant output level characteristics with threshold behavior at the input side and producing either sinusoidal output signals at a frequency that is equal to the multivibrator frequency, or no output at all depending upon the pattern detection by the two photosensitive elements 10 and 11.

The output of amplifier 18 is usable directly in case one wishes to distinguish merely between an "absence-of-pattern" situation and a "presence-of-pattern" situation as defined above. An indicator 24 is connected to respond to the outputs of amplifier 18 to provide for a suitable indication or control signals for the two different cases. An example of this type will be described somewhat later in this specification.

Figure 2A:
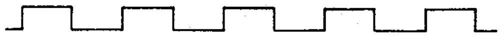
Figure 2B:
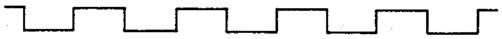

It is possible, however, to distinguish among the two different true patterns. The FIGURE 2A illustrates the output signal provided to terminal 16 and indicates one of the two true pattern situations in which, for example, the photosensitive element 10 receives less and photosensitive element 11 receives more light due to the particular regional modulation pattern that produces such a difference in illumination. The other true pattern recognizable with this assembly is defined by an illumination distribution or modulation in which photosensitive element 10 receives more light than element 11. The output signal for this case is as depicted in FIGURE 2B. One can see, that there is a phase-shift of 180° between the two signal trains as shown in FIGURES 2A and 2B.

Figure 2C:
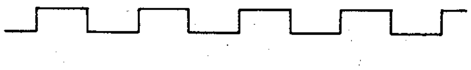

FIGURE 2C illustrates the output of flip-flop of multivibrator 17 after a phase-shift of 90°. In comparison with the signal train of FIGURE 2C, the wave train in FIGURE 2A is leading and wave train of FIGURE 2B is lagging. Thus, the two patterns can be distinguished by determining the phase or the polarity of the phase of the output signal provided by the amplifier 18 in relation to a phase-shifted output of multivibrator 17. The remaining elements of circuit, shown in FIGURE 1, realize this mode of pattern recognition.

Preferably there is provided a filter network 20 which should have narrow bandwidth characteristics to eliminate the harmonics and subharmonics of the output of multivibrator 17. A phase-shifter 21 produces the desired 90° phase shift. The phase-shifter 21 may be dispensed with if amplifier 18 introduces a phase into the signal train derivable from signal summing point 16 in comparison with the wave train derivable from the multivibrator 17. It may be advisable to make the phase-shifter 21 adjustable in order to adjust the system to any given system phase relationship.

A phase discriminator or detector 22 has its two input terminals connected respectively to the output sides of amplifier 18 and of phase-shifter 21. The D.C. output side of phase detector 22 provides either a positive signal, a zero signal or a negative signal thereby denoting the first pattern, no pattern, and the second pattern, respectively. An indicating device 23 responds to the output signal of phase detector 22. A positive ouput signal of detector 22, for example, may be representative of the illumination pattern which produced the signal train shown in FIGURE 2A. The negative signal will then be representative of the illumination pattern that produced the signal train in FIGURE 2B. An output zero will be produced by the phase detector in the two absence-of-pattern situations.

Thus, by determining the polarity of the signal derived from the phase discriminator 22, it is possible to distinguish between the two patterns, and this includes the possibility of detecting the two absence-of-pattern situation without, however, distinguishing among them. The entire detecting circuit operates without providing any reference signal that monitors ambient light conditions, nor is the circuit disturbed by a change in ambient light conditions.

It may not be desirable to provide for a continuous pattern detection in case the objects are exchanged. It is conceivable, that the scenery in front of the detectors varies continuously, but more prevalent are the cases of an intermittent change. Thus, a master gate control 28 may be provided to respond in any suitable way to the proper positioning of the object to be inspected in front of detectors 10 and 11. This master gate 28 may become effective anywhere in the circuit. As any exchange of objects will necessarily set up oscillatory signal components in the circuit, covering a wide range of frequencies including the multivibrator frequency, the gating will preferably occur at an instant when the pattern defining signals have settled, i.e., when stationary or quasistationary dynamic conditions prevail. As symbolically indicated, the output path of amplifier 18 may be suitable for this gating operation. Alternatively one could use the output path of detector 22 or either one of the indicators 23, 24 itself for applying this gating signal.

Figure 3:
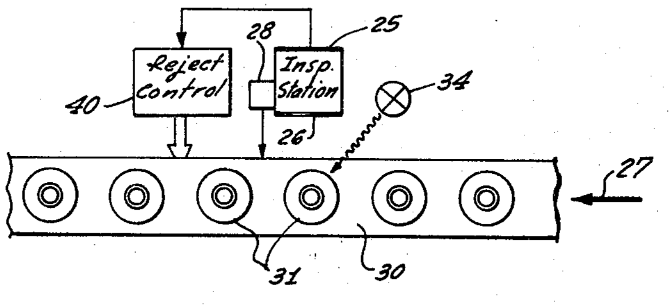
FIGURE 3 illustrates somewhat schematically a top view of a container inspection system susceptible of incorporating various types of embodiments of the invention.

FIGURE 3 illustrates schematically how this pattern recognition circuit can be utilized with advantage in a container inspection apparatus. In FIGURE 3, is shown a conveyor belt in top view and transporting containers such as bottles 31 in a direction of arrow 27 past an inspection or monitoring station 25. The station 25 has an interface 26 oriented to face a particular inspection zone in which a container 31 is located during the inspection period. This inspection zone may include the entire container or a portion thereof as will be developed hereafter. The inspection station 25 is illustrated as being positioned in lateral relation to the conveyor belt and the containers thereon. However, the station may be positioned above the belt and a container when in the inspection zone, or the station may grip around the container. The detector 28 responds to the presence of a container in the inspection zone to trigger or turn on the inspection station for response. A light source 34 provides for sufficient field illumination of the object in the inspection zone.

Systems of this type are known, in general, and do not have to be described in detail. The present invention involves particulars of the inspection station for pattern recognition, here of a pattern on the container.

Figure 4:
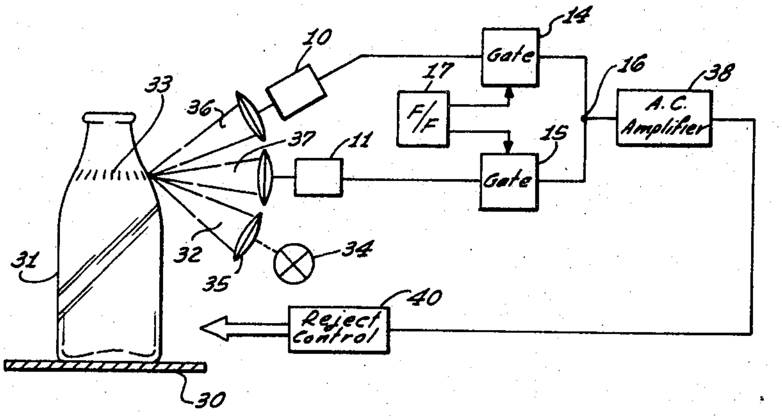
FIGURE 4 illustrates somewhat schematically a bottle-neck inspection station.

Proceeding now to FIGURE 4, there is shown a first type of inspection station. The object of this inspection station is to find out whether there is any lettering at the lower neck portion 33 of a bottle 31. This lettering may appear in the form of a label, or more conventionally, there may be letters raised or embossed in the glass of the bottle. The source of light 34 is suitably positioned and, in cooperation with the condenser lens 35, an illuminating beam 32 preferably of narrow dimensions, is directed towards the limited area 33 in which there may be lettering or there may not be lettering. The beam 32 thus defines the inspection zone.

The bottle surface, as such will reflect specularly a certain amount of light which may differ for various bottles, but there is always a considerable illumination component which is reflected in accordance with the geometric laws of reflection and in a direction 36 to reach the photosensitive element 10. In case the bottleneck portion 33 includes lettering, light will deviate from this path 36 partially by specular, partially by diffused reflection, due to the embossed or engraved lettering, and such light will reach the second photosensitive element 11.

During absence of a letter no or very little light will reach the receiver or element 11. By suitable gain control, it can be made possible that in the "presence of lettering" situation, the signal output levels, as provided by the two photosensitive elements 10 and 11 are equal or at least substantially equal. If the area of diffused reflection as monitored by the photosensitive element 11 has a rather wide solid angle then the particular type of lettering in connection with the particular position of the bottle as inspected does not enter into the illumination level which reaches the photosensitive element 11. This aspect can be accomplished in general by providing suitable desensitizing means of a conventional nature including a wide angle detecting range for element 11.

It is, however, apparent that a presence-of-lettering situation is recognized here by the two photosensitive elements 10 and 11 as an "absence-of-pattern" situation, whereas absence of lettering produces a "presence-of-pattern" situation. However, by using a signal inverter in the output circuit in one of the photosensitive elements, the "presence-of-lettering" case will be also a "presence-of-pattern" situation.

The type of situation and circuit used specifically for signalling will depend on the objective of the inspection. If the desired situation is a bottle with lettering, then the absence-of-lettering will be the error case to be used for eliminating or rejecting the bottle. Here then, it is advisable to use the circuit as illustrated, i.e., without inversion.

In the circuit under consideration there is also provided the multivibrator 17 and the two output gates 14 and 15 respectively having signal input sides connected to the photosensitive elements 10 and 11, while their gating terminals are governed by the two output signals of multivibrator 17 as aforedescribed. An A.C. amplifier 38 responds to the A.C. component of the signal applied to input junction 16, and a first output signal level is produced when a bottle without lettering is in the inspection zone, while a second (possibly zero) signal output level is produced if there is letter on the bottle 31 as inspected at that instant.

The output of the amplifier 38 can be used to control the reject mechanism or device 40 of conventional nature. This example now lends itself conveniently to the description of the fact that the pattern-no pattern situation can be reversed if the bottle without lettering is the normal or desired one while a bottle with lettering represents the error situation. If element 11 or gate 15 now incorporates an inverter by using a cathode or emitter follower type amplifier, a "no-pattern" situation is construed as meaning "no-lettering." The photosensitive element in device 11 receives no light when there are no letters while photosensitive element device 10 does receive light. The "no-lettering" situation is identified by uniform signal outputs of the two elements 10 and 11 whereby due to the inversion characteristics of element 11 or gate 15 the absence of letter situation results in a uniform signal at terminal 16, while presence of lettering causes an A.C. train to appear in junction 16 and at a rate determined by the multivibrator 17. This A.C. signal is applied to the amplifier 38 and processed as aforedescribed.

Figures 5, 6:
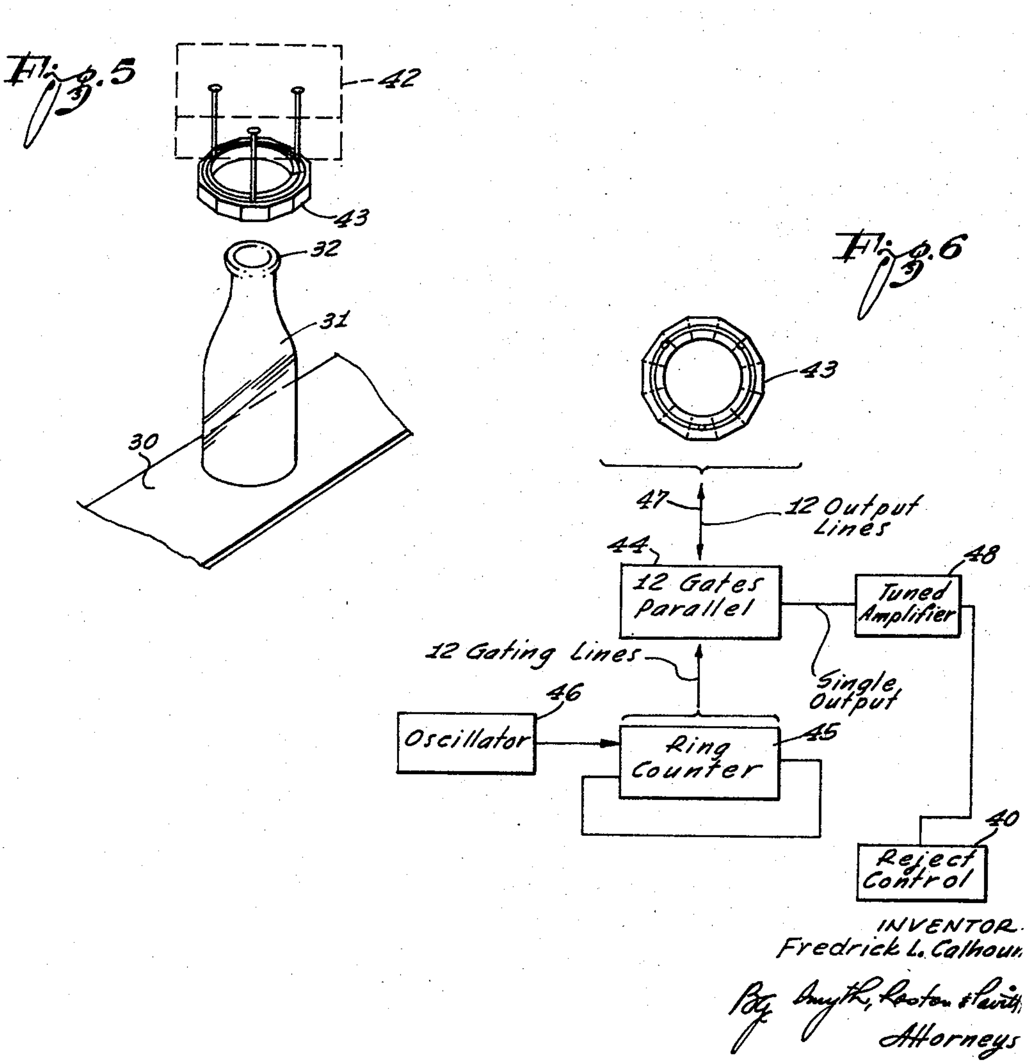
FIGURE 5 illustrates somewhat schematically a bottle rim inspection station.
FIGURE 6 illustrates a block diagram of the processing system for the signals developed in the station shown in FIGURE 5.

Proceeding now to a description of FIGURES 5 and 6, it is illustrated here that the inventive concept can be used with advantage for the same type of inspection apparatus but having a different inspection zone and different processing unit. Basically again, a bottle inspection device is envisioned, however, the inspection is directed toward the rim portion of the bottle.

Particularly, it shall be determined whether a bottle as passing on the conveyor belt 30 has a chipped rim. The inspection station envisoned here, may be positioned in spaced relationship to the bottle inspection station shown in FIGURE 3.

The inspection station primarily comprises an inspection head 42 positioned above the bottle path. A bottle position monitoring device analogous to master gate 28, supra, senses the relative position of the bottle 31. The proper inspection position is established when the bottle 31, particularly the upper rim thereof is positioned concentrically to a circular arrangement 43 of photosensitive elements which are the pattern sensing elements of this inspection device 42. The inspection arrangement is shown more particularly in FIGURE 6. There are altogether twelve such photosensitive elements. These photosensitive elements are, as far as their outputs are concerned, individually adjustable in the sense that a bottle without a chipped rim will direct illumination levels into each and every one of these photosensitive elements 43, which results in equal or equalized outputs. This here is the "absence-of-pattern" situation. There are, as schematically indicated, twelve gates 44 respectively having twelve input terminals which respectively connect to the twelve photosensitive elements 43. The signal output terminals of the twelve gates are combined to feed a composite signal to a common output line 47.

Next, there is provided a ring counter 45 having, for example, twelve flip-flop stages operated as shift register with recirculation. The triggering or shifting pulses are signals derived from an oscillator 46 which may be a multivibrator or any other convenient or suitable oscillator.

The ring counter 45 is of the type wherein only one stage at a time is energized or in the on-state while all other stages are in the false or off-state; the on-state is shifted cyclically through the twelve stages of ring counter 45 to furnish an individual gating signal to one of the gates of gate assembly 44 in sequential steps.

It is, however, not necessary to employ a ring counter having as many stages as there are gates or different counting numbers to be distinguished. Instead, one can use an ordinary binary counter having as many stages (here four) as are needed to express the number of detectors and gates in binary expansion. For each number thus representable and needed, there is a coincidence gate, each coincidence gates responding to a particular count number when reached by the binary counter to provide a gating signal for one of the signal gates 44. It is thus apparent, that the type of counter used is not critical; the main point is that a counting element or device is provide which is capable of distinguishing between as many different counting states as there are individual photosensitive elements with output gates, and that means are provided to permit cyclic repetition of counting.

During operation, the single output line or signal combining output line 47 to the twelve gates 44 will receive cyclically signals as they are picked up by the twelve photosensitive receivers 43. Hence, the assembly 44 and 45 constitutes an electronic scanner or sampler of the photosensitive arrangement 43. The pattern observed here is the presence or absence of one or more chips in the supposedly smooth bottle as monitored by this ring-shaped photosensitive arrangement.

In case there is no chip (no pattern) the output as provided to the lines 47 will be a uniform signal having a level that possibly varies with the ambient light or environment, but this has no bearing on the information content to be transmitted. A tuned amplifier 48 of the type aforedescribed, possible with threshold characteristics, is connected to the outline line 47 receiving no A.C. input in a case a smooth, i.e., undamaged bottle rim is in the detector range (inspection zone) so that the output in this no-pattern situation is zero signal.

As soon as a chip is monitored, it will appear that one or two of the photoelectric receivers or detectors will receive more or less light than the others which depends on the type of chip. If the chip deflects light, which is normally reflected into a photoelectric receiver by an unchipped bottle rim, this receiver will receive less light than the others. Alternatively the chip may have a focusing effect in that it directs more light than normal into that particular photoelectric receiver. It basically does not matter whether the light variation as sensed by this particular photosensitive element is an increase or a decrease in light. By sensing either an increased or a decreased illumination level, it is apparent that the signal output level of that particular element will differ from the signals resulting from preceding and subsequent sampling of other elements. It is extremely unlikely that a chip directs an illumination intensity into a particular photo cell which is not different from the intensity sensed by the other receivers.

Thus, at a rate determined by the ring counter cycle frequency, there will be a pulse of a duration which is equal to the repetition rate period as provided by the oscillator 46, thus having a fundamental of half that frequency if one disregards repetition of sampling. It is advisable, therefore, to tune the amplifier 48 either to half the oscillator frequency or to the ring counter frequency for repeated sampling. The ring counter cycle frequency is a fundamental in the signal as transmitted by the gate assembly 44 and the frequency having half the frequency of oscillator 46 appears as a harmonic, as it would result from a Fourier analysis of the signal passing through line 47. It is basically immaterial which particular frequency is used here for pattern recognition and depends primarily on the characteristics of the circuit employed and the general operating conditions.

Two factors have to be considered here. One factor is that the rims of the several bottles will differ somewhat because inexpensive bottles simply vary in overall proportions, and they are not too accurately made as far as similarity is concerned. Hence, it is inevitable, that the signal in line 47 will often have an A.C. component equal to the counter cycle frequency, i.e., the frequency of sampling repetition. On the other hand the signal in line 47 will have a component which is equal to the switching (shifting) frequency of the circuit which is, of course, the oscillator frequency, and may include switching spikes.

Either type signal is noise. It is thus advisable to give the amplifier 48 a threshold of response which is rather high, and in order to avoid an undesired desensitizing of the circuit, the amplifier will preferably be tuned to a band of rather narrow width and which excludes both the oscillator frequency and the ring counter cycle frequency, and may be tuned for peak response at half the oscillator frequency.

Figure 7:
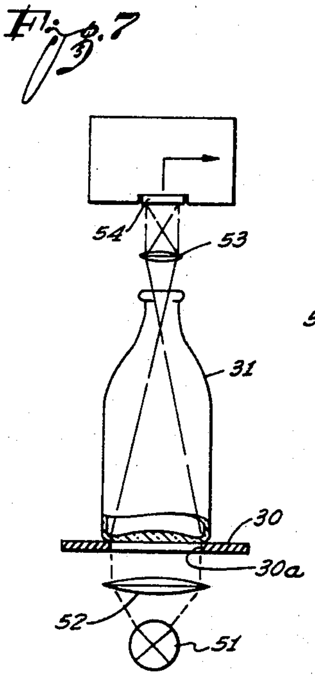
FIGURE 7 illustrates schematically a bottle-bottom inspection station.
Figure 8:
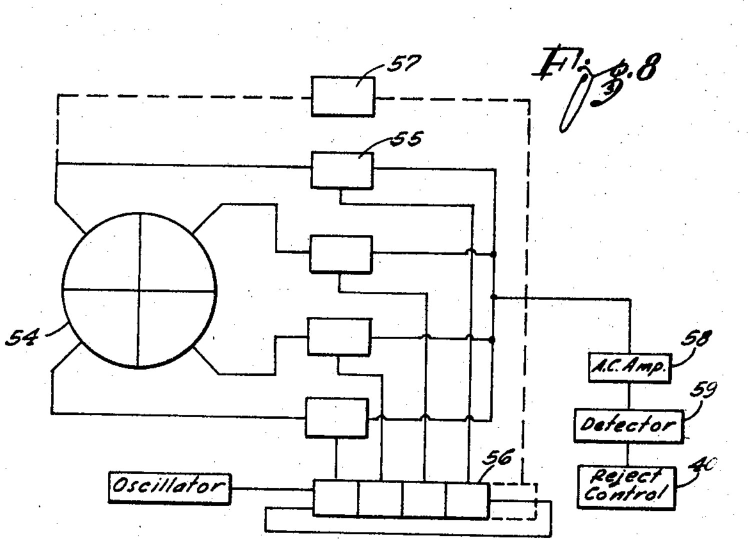
FIGURE 8 illustrates a block diagram of the processing system for signal developed in the station shown in FIGURE 7.

FIGURES 7 and 8 illustrate another kind of pattern recognition device; the example illustrated is again taken from the field of bottle inspection and can be construed as constituting another type of inspection station (FIGURE 3). In this case, the objective is to inspect bottles such as 31 as to cleanliness. For this purpose, the bottles are passed along on a conveyor belt 30 past the detector station. In particular, the cleanliness of the bottom of a bottle is to be inspected. The bottom is appropriately illuminated by a lamp 51 shining through a suitable opening 30*a* in the conveyor belt 30, and a lens system such as 52 and 53 images the bottom of the bottle onto a photosensitive arrangement 54.

The photosensitive arrangement 54 is comprised of, for example, four sector-type photoelectric elements such as is shown in FIGURE 8, and which in toto observe the image of the bottle bottom. The number of elements is not critical per se, but as in the embodiments before, the number of photoelectric elements employed here bears a direct relationship to the area size as observed by each sector at a given image size, and this, in turn, determines the sensitivity of the device, as only particles of a minimum size will cause a sufficient change in the light intensity sensed by an individual sector element. Thus, the more critical the inspection is to be the more sectors have to be used. Four sectors are sufficient for most instances.

In a manner that is also analogous to the aforedescribed embodiments, the four photosensitive elements 54 feed their individual output signals to respective input signal terminals of four signal gates 55, which are sequentially and individually enabled through a ring counter 56 triggered for shifting type operations from a clock pulse source or oscillator. An amplifier 58 receives sequentially and cyclically the output signals of the four gates.

The size of a dirt spot, i.e., its extension as well as the number of dirt particles cannot be anticipated in detail. Thus, it is inadvisable to tune the amplifier 58 as employed in this embodiment to any particular frequency because, for example, some dirt particles may extend across the borderline between two neighboring sectors as covered by two photosensitive elements, and such extension will cause a decrease in the illumination that reaches both of these two photosensitive elements. Such decrease is quite possibly almost uniform, particularly if the particle has a size close to the minimum detectable by each element.

On the other hand, it is extremely unlikely, that four equally sized dirt particles are positioned to equally dim the light intensity detected by each of them.

It can safely be concluded that any pattern resulting from dirt particles may be recognized and will cause an AC signal that has a frequency equal to half, or one-fourth of the clock pulse frequency, or the frequency of the ring counter, and beat frequencies of these frequencies as well as harmonics. A centrally located dirt particle may affect three or even all four of the photosensitive elements and will, therefore, produce a signal having the frequency that is equal to the cycle frequency of the ring counter which is, in this case, one-fourth of the oscillator frequency period. The case that a dirt particle is located precisely centrally, is too unlikely a situation to cause any serious concern. Nevertheless, the following extension of the system as indicated in dotted lines will implicitly take care of this improbable case.

It will be apparent, that without further measures the system will not detect an overall uniform dirt layer. By using an inverter type gate 57 connected additionally to one of the photo detectors, an output signal can be obtained which will increase with decreasing overall brightness as received by all detectors in case of an overall dirty bottle. This output signal may be used as fifth output channel, requiring a fifth counter stage accordingly. However, as was stated above care must be taken in this situation to maintain uniform illumination because otherwise light dimming will then be picked up as simulating dirt.

Amplifier 58 is preferably tuned to a frequency range having on its long end the ring counter frequency and on its short end half the clock frequency. For a clean bottle, a detector 59 will respond to absence of an A.C. signal while any dirt particle will produce an A.C. component. The detector 59 may use this signal to operate the reject mechanism 40, which for all practical purposes is similar to any of the reject mechanisms referred to above.

Figure 9:
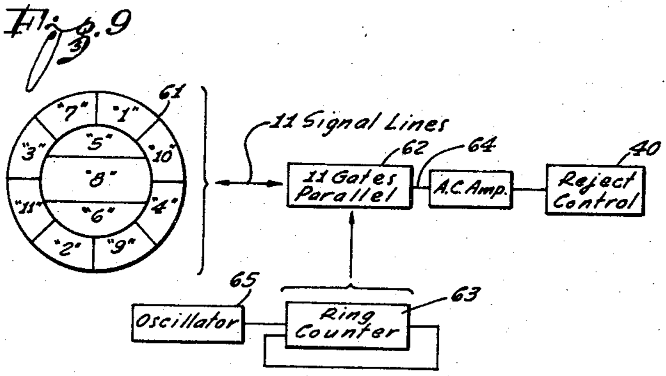
FIGURE 9 illustrates a block diagram of an alternative processing system shown in FIGURE 7.

In case the state of the bottles, as far as cleanliness is concerned is rather critical, it is advisable to increase the sensitivity of the detecting circuit, which can be done by employing more photosensitive elements as stated. FIGURE 9 illustrates this increase in overall sensitivity by way of a representative example. In this particular example care has also been taken to avoid a convergence of borders in the central region of the bottle. The pattern set out here by the eleven photosensitive elements 61 is readily derivable from FIGURE 9. These elements and their mutual arrangement have certain additional features of importance. One aspect of this particular embodiment is that there is no point where more than three photosensitive elements have a common border point. To state it differently, no more than three different borders are allowed to intersect. Inasmuch as altogether eleven photodetectors or elements are employed, it is obvious that all detectors can be affected by dirt only in the case of an overall dirt layer at the bottom of the bottle to be inspected, but this can be remedied here as was mentioned above.

The numbers written onto the photosensitive elements in FIGURE 9 show, by way of a representative example, the sequence of scanning and sampling. Each element has its output connected to one of the eleven gates 62. The numbers on elements 61 in FIGURE 9 illustrate in effect a particular connection pattern as between a corresponding set of eleven output gates 62, and the individual stages of an eleven stage ring counter; i.e., the numbers denote the sequence of activation of the respective output gates by the ring counter. In this case, the scanning pattern is set up so that sequentially activated or sampled photosensitive elements are positioned rather remote from each other. More particularly, two elements interrogated in immediate sequence do not have any common border. Thus, any dirt particle that extends over any border will not cause illumination variations of two photosensitive elements as they are scanned in immediate sequence. Any dirt particle in the area of intersection of two or three borders cannot possibly cause an illumination decrease in two or even three cells interrogated in immediate sequence.

The particularity of the scanning pattern in this case will cause any individual dirt particle to produce an output signal in the common output line 64 of the eleven gates 62 that has a strong component which is equal to half the oscillator frequency of the oscillator 65 triggering the ring counter 63. An A.C. amplifier 66 receiving the sampled signals in line 64 in this case can be tuned to half the oscillator frequency with very narrow band width.

Again, of course, care must be taken that switching spikes in the signal path 64 are eliminated in order to avoid their simulating dirt indicating signals. As these spikes have a rather high frequency, the amplifier 66 may include specifically filter means to the extent of eliminating all frequencies higher than half the oscillator frequency.

Of course, any scanning pattern cannot preclude the possibility that two dirt particles are detected by photosensitive elements which are interrogated in immediate sequence. However, it is unlikely that the particles are of equal size and even if they are, a Fourier analysis of the signal in line 67 still will show a strong component of half the oscillator frequency.

In a manner analogous to the aforedescribed situation, the output of amplifier 66 triggers reject mechanism 40 which eliminates the dirty bottle and prevents it from being passed further along the conveyor belt 30.

Figure 10:
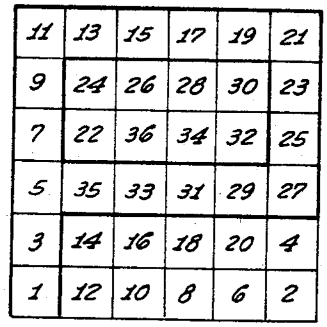
FIGURE 10 illustrates schematically a letter recognition detection panel with scanning pattern.

Up to this point the pattern recognition device has been restricted in its application merely to the dynamic sensing of absence or presence of a pattern, representatively illustrated for the inspection of bottles as to dirt or damage. The inventive concept, of course, permits application to a more sophisticated pattern recognition device which goes beyond the mere recognition of absence or presence of any pattern but responds to absence or presence of a particular pattern. This was outlined already with reference to FIGURE 1. FIGURE 10 shows representatively thirty-six photocells of, for example, uniform size, which is by no means essential, but only shown here for purpose of simplification.

These photocells are arranged to observe a square-shaped area and to recognize and identify, for example, the letter "P." The "P" may be imprinted, embossed or the like on the face of a bottle or any other container or surface, and the surface which may bear this particular letter is imaged onto the photoelectric arrangement, as shown in FIGURE 10.

The numbers written into FIGURE 10 show by way of example a scanning pattern or sequence of sampling for these photosensitive elements. Just as was described with reference to the other embodiments of the invention, the photosensitive elements are not effective, monitored, sampled or interrogated concurrently but sequentially as to their individual response to the illumination of the limited object or image field each element observes. The pattern is selected that if in case the letter P is imaged onto these photosensitive elements in the expected configuration, eighteen cells will receive less light and eighteen cells will receive more light. Which group receives more or less is immaterial; the main point is that there is an equal number of photosensitive cells which should receive more light than the other half.

Figure 11:
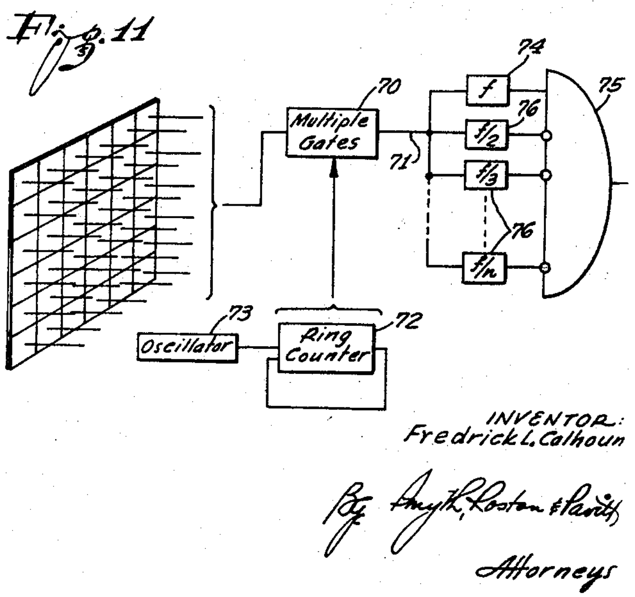
FIGURE 11 illustrates somewhat schematically a processing system for letter recognition using a panel of the type shown in FIGURE 10.

The scanning pattern is selected that for the case of recognition, the elements will produce a train of half the oscillator frequency of the oscillator that triggers the sequencing of sampling, with no longer wave presisting. FIGURE 11 illustrates a pattern detector circuit which can be employed here. Again, there are provided, in this case, altogether thirty-six pattern gates 70 individually governing the transfer of the output of the thirty-six photosensitive elements to a common line 71. A counter 72 provides sequential enabling signals for the thirty-six signal gates employed in this case.

The connection between the thirty-six photosensitive elements, as shown in FIGURES 10 and 11 and the gates 70 as they are sequentially enabled, and the counter 72 are made to establish the scanning pattern indicated in FIGURE 10. If the letter P is in front of these thirty-six photosensitive elements, the output line 71 will receive a wave train of block pulses at the precise rate of half the oscillator frequency of oscillator 73 which triggers the counter 72. Thus, the connection pattern is set up so that in case the pattern to be recognized, here the letter P, is indeed being detected, elements receiving less light are alternated with regard to the sequence of interrogation. The oscillator frequency may be 2F; then the fundamental frequency of this wave train will be F. This means that for this particular pattern recognition situation, the wave train in line 71 is free from any components which have a frequency of $F/2$ or $F/3$ or $F/4$ . . . or $F/N$ with $N$ here being thirty-six, and $F/N$ in this instance represents the counter cycle frequency.

A band pass signal tuned to the frequency F, of course, will not suffice to detect this situation, as any darkening of any individual photosensitive element will produce a component having the frequency F. The presence of a signal of frequency F is, as in the cases before, merely an indication that a pattern, for example, any letter is in front of the photodetectors. The particular pattern, letter P, will be recognized if the output signal as provided in channel 71, has only the frequency F (and high harmonics which are unimportant) and there are no signals having the frequency $F/2$, $F/3$ etc.).

Reference numeral 74 denotes a tuned amplifier with narrow band pass characteristics to respond to frequency F and producing a D.C. output signal upon detecting a signal component of frequency F in the signal train in line 71. Reference number 76 denotes tuned amplifiers respectively being tuned to the several frequencies $F/2$, $F/3$, etc. and providing similar D.C. output signals to indicate respectively the presence or absence of these particular types of signal components. The outputs of these altogether thirty-six tuned amplifiers connect to a coincidence gate 75, which responds particularly to the situation that its output is true if the output of detector 74 is true, while the output of the other detectors 76 must all be false, and only in this situation is it possible that the pattern to be recognized is positioned in front of this photoelectric arrangement. In the embodiments above, the various photosensitive elements were to observe an area without a dead zone in the area to be inspected, and can be interrogated basically at random. A cyclic scanning pattern is preferred for purposes of instrumentation, but is not essential. For purposes of implementation it is of advantage to use a scanning pattern or scanning rules avoiding a scanning of neighboring elements in immediate succession. If this rule is observed, it may even be advisable to use a slight overlap of detecting ranges of each individual photosensitive element with the area observed by its neighboring photosensitive elements so as to avoid borderline conditions, i.e., particles on the borderline must not escape detection. Borderline case may require that the device be made sensitive to an extent which endangers this system in that it may respond to noise.

Another rule is that, of course, a particular scanning pattern has to be followed if a particular pattern is to be detected and not just merely the presence of any pattern. It seems to be advisable and preferred to select a scanning pattern which results in a strong A.C. signal at half the scanning rate frequency.

With the exception of harmonics, this is the highest frequency as far as detectable fundamentals are concerned. This half-the oscillator frequency will always be present as long as any kind of brightness variation is being picked up by any of the detectors in any kind of pattern arrangement, but all signals of longer frequencies can be made to be eliminated to define the presence of a particular desired pattern.

A comparison between the device in FIGURE 1 and that in FIGURES 10 and 11 will reveal that the pattern recognition device shown in FIGURE 11 will respond if the "P" appears as a dark P on a bright background or vice versa. These two situations are equivalent as far as the frequency recognition circuit is concerned in this particular detecting device. If these two equivalents are to be distinguished, then a phase detection device, as explained with reference to FIGURE 1, can be used because the bright-dark and dark-bright situations will distinguish by leading or lagging phases respectively relative to a 90° phase shifted reference train for the production of which the oscillator or the lowest order counter stage can be used as was described.

The invention is not limited to the embodiments described above but all changes and modifications thereof not constituting departures from the spirit and scope of the invention are intended to be covered by the following claims:

1. A pattern recognition system for distinguishing objects having particular characteristics in a particular area from objects having in the particular area characteristics different from the particular characteristics;

means disposed relative to the object for directing energy toward the object for the passage of energy from the object in accordance with the characteristics of the object in the particular area, at least first and second energy-responsive means respectively disposed relative to the object to receive energy passing from the object in individual portions of the particular area, the amount of energy received by the first responsive means relative to the amount of energy received by the second responsive means depending on an absence or presence of the particular characteristics in the individual portions of the particular area;

means operatively coupled to the first and second energy-responsive means for sequentially sampling the first and second energy-responsive means on a repetitive basis, and means operatively coupled to the first and second energy-responsive means for operating upon the signals sequentially produced by the first and second energy-responsive means to produce a signal having particular characteristics upon the occurrence of an object with the particular characteristics in the particular area.

2. The system set forth in claim 1 wherein the last mentioned means are responsive to signals of a particular frequency to indicate the occurrence of an object with the particular characteristics in the particular area.

3. In combination in a system for sorting containers having particular characteristics in a particular area from containers having in the particular area characteristics different from the particular characteristics;

means disposed relative to each container for directing energy toward the container for the passage of energy from the container in accordance with the characteristics of the container in the particular area on the container;

at least first and second energy-responsive means respectively disposed relative to the container to receive energy passing from the container in individual portions of the particular area and to produce signals having characteristics in accordance with the characteristics of the received energy;

means operatively coupled to the first and second energy-responsive means for sequentially sampling the first and second energy-responsive means on a repetitive basis, and means operatively coupled to the first and second energy-responsive means for operating upon the signals sequentially produced by the first and second energy-responsive means to produce an output signal having particular characteristics upon the occurrence of a container with the particular characteristics in the particular area.

4. The combination set forth in claim 3 wherein the last mentioned means produces an output signal at a particular frequency upon the occurrence of a container with the particular characteristics in the particular area.

5. In combination in a system for sorting containers having particular characteristics in a particular area from containers having in the particular area characteristics different from the particular characteristics, means disposed relative to the container for directing energy toward the container for the passage of energy from the container in accordance with the characteristics of the container at the particular area on the container, at least first and second energy-responsive means respectively disposed relative to the container to receive energy passing from individual portions of the particular area in different directions and to produce signals in accordance with such received energy, means operatively coupled to the first and second energy-responsive means for sequentially sampling the first and second energy-responsive means on a repetitive basis, and means operatively coupled to the first and second energy-responsive means for operating upon the signals sequentially produced by the first and second energy-responsive means to produce a signal having particular characteristics upon the occurrence of a container with the particular characteristics in the particular area.

6. In combination in a system for sorting containers having particular characteristics in a particular area from containers having in the particular area characteristics different from the particular characteristics, means disposed relative to the container for directing energy toward the container for the passage of energy from the container in accordance with the characteristics of the container at individual portions of said particular area on the container, at least first and second energy-responsive means respectively disposed relative to the container to receive portions of energy passing from the individual portions of the particular area on the container and to produce signals in accordance with such received energy, means operatively coupled to the first and second energy-responsive means for sequentially sampling the first and second energy-responsive means on a repetitive basis; and means operatively coupled to the first and second energy-responsive means for operating upon the signals sequentially produced by the first and second energy-responsive means to produce a signal having particular characteristics upon the occurrence of a container with the particular characteristics in the particular area.

7. A pattern recognition device, wherein a pattern is defined as a regional modulation of radiation susceptible to detection by differently positioned radiation sensitive elements, including:

a plurality of radiation sensitive elements positioned and oriented to be energized by such radiation in variable combinations of high and low energization, at least one particular combination constituting a desired pattern, at least one other combination constituting an undesired pattern;

scanning means for sequentially sampling the state of energization of said elements on a repetitive basis; and signal means responsive to said sequentially sampled signals for producing a signal having distinguishable characteristic oscillatory components upon the occurrence of a particular one of the desired and undesired patterns to distinguish between the desired and undesired patterns.

8. In combination in a system for sorting containers having particular characteristics in a particular area from containers having in the particular area characteristics different from the particular characteristics, an energy source disposed relative to the container to direct energy toward the containers for the passage of energy from individual portions of the particular areas on the container, at least first and second energy-responsive means positioned relative to the container to receive light passing from the containers, in the individual portions of the particular area, switching means operatively coupled to the first and second energy-responsive means to sequentially sample the first and second energy-responsive means on a repetitive basis, and means operatively coupled to the first and second energy-responsive means for producing a signal having particular characteristics to represent the occurrence of containers with the particular characteristics in the particular area in accordance with the relative characteristics of the signals produced by the first and second means.

9. In a system for inspecting a container for particles of foreign matter, energy means disposed relative to the container for providing a field of energy characteristically modulated by any particles of foreign matter in the container;

a plurality of energy sensitive elements each positioned to individually respond to an individual portion of said field of energy as modulated by said particles, the energy sensitive elements being positioned to respond on a composite basis to the entire field of energy, means for interrogating each of said elements on a sequential and repetitive basis, each element as interrogated providing a signal representative of the modulation of energy by the individual portion of the field to which it responds;

means for sequentially combining all of said signals as provided by said elements when respectively interrogated to form a composite signal, thereby referencing a signal of any element in a plurality against signals provided by respective other elements in the plurality; and signal means responsive to said composite signal for analyzing said composite signal as to characteristic oscillating components representative of absence or presence of foreign particles in said container to provide an indication as to the presence or absence of foreign particles in said container.

10. In a system for inspecting a container for flaws, energy means disposed relative to the container for providing a field of energy characteristically modulated by any flaws in the container;

a plurality of energy sensitive elements each positioned to individually respond to an individual portion of said field of energy as modulated by a flaw in the container;

means for sequentially and repetitively interrogating each of said elements, each element as interrogated providing a signal representative of the modulation of energy by the individual portion to which the element responds;

means for combining all of said signals as provided by said elements when respectively interrogated to form a composite signal, thereby referencing a signal of any element in the plurality against signals provided by respective other elements in the plurality; and signal means responsive to said composite signal for analyzing said composite signal as to characteristic oscillating components representative of absence and presence of flaws in said container to provide an indication of any flaws in the container.

11. An optical inspection system, including:

a plurality of radiation sensitive elements positioned to individually monitor the radiation directed towards any particular one of said sensitive elements from individual portions of a particular region, the elements in the plurality being positioned to monitor all of the particular region on a composite basis;

a plurality of output means individually connected to said different elements in the plurality to produce signals respectively representative of the radiation as received by said elements and being adjustable to define a predeterminable no-pattern situation as a signal with substantially uniform characteristics;

a common output;

high speed scanning means for sequentially and repetitively interrogating said output means on an individual basis to pass to the common output the respective signals provided during the interrogation of each output means; and signal means characteristically responsive to at least one alternating signal component representative of the pattern situation to be detected while suppressing any direct signal components produced by said elements.

12. A container inspection station for monitoring a specific characteristic of a bottle representable as characteristical modulation of radiation by the container, such characteristic modulation providing distinguishable regions of strong and weak radiation as the result of characteristic modulation, including:

a plurality of radiation sensitive elements individually responsive to radiation as characteristically modulated by different portions of the bottle;

a like plurality of signal transmission means respectively connected to said elements, said transmission means being selectively enabled and disabled;

means for individually and sequentially enabling said transmission means, each for a substantially similar period and at a repetition rate that is related to the period times the number constituting said plurality; and means responsive to all of said signals as passed through said transmission means when respectively enabled to detect the presence or absence of signal frequencies which include at least one frequency related to said repetition rate.

13. In combination in a system for sorting containers having a particular characteristic in a particular area from containers having in the particular area characteristics different from the particular characteristics, conveyor means for providing a movement of the containers along a particular path, energy means disposed relative to the containers on the conveyor means for directing energy towards the containers for the passage of energy from the containers in accordance with the characteristics of the containers at different positions on the containers, at least first and second energy-responsive means disposed relative to the containers on the conveyor means for receiving energy from individual portions of the particular area to produce signals in accordance with the characteristics of such received energy.

means operatively coupled to the first and second energy-responsive means and responsive to the movement of each container past a particular position in the particular path for sequentially activating the first and second energy-responsive means on a repetitive basis, and means operatively coupled to the first and second energy-responsive means for operating upon the signals from the first and second energy-responsive means to produce, in accordance with the relative characteristics of the signals from the first and second energy-responsive means, an output signal having first characteristics representing the occurrence of a container with the particular characteristics in the particular area and having second characteristics representing the occurrence of a container with other characteristics than the particular characteristics in the particular area.

14. The combination set forth in claim 13 wherein means are operatively coupled to the last mentioned means to obtain a movement in a first particular path of the containers with the particular characteristics in the particular area and to obtain a movement of the containers in a second particular path different from the first particular path of the containers with the other characteristics in the particular area.

15. An electro-optical inspection system, including:

a plurality of radiation sensitive elements together monitoring all of the radiation from a particular region as to regional modulation, at least during particular inspection periods, each element responsive to the radiation from a particular portion of the particular region;

interrogating means for sequentially and repetitively interrogating all of said elements as to the radiation received by the interrogated elements;

means for combining the result of said interrogation to form a composite signal; and means responsive to particular oscillatory modulation components of said composite signal to detect the regional modulation patterns of said radiation.

References Cited

UNITED STATES PATENTS 3,033,448 5/1962 Quinn ---------- 209—111.7 X
3,123,715 3/1964 Husome -------- 209—111.7 X
3,153,727 10/1964 Nathan --------- 209—111.7 X
3,292,785 12/1966 Calhoun ---------- 209—111.7

M. HENSON WOOD, JR., *Primary Examiner.*

R. A. SCHACHER, *Assistant Examiner.*